(12) United States Patent
Ruihley

(10) Patent No.: US 7,572,975 B2
(45) Date of Patent: Aug. 11, 2009

(54) ELECTRICAL BOX WITH MOUNTING SYSTEM

(75) Inventor: Robert E. Ruihley, Bryan, OH (US)

(73) Assignee: Allied Moulded Products, Inc., Bryan, OH (US)

( * ) Notice: Subject to any disclaimer, the term of this patent is extended or adjusted under 35 U.S.C. 154(b) by 0 days.

(21) Appl. No.: 11/945,742

(22) Filed: Nov. 27, 2007

(65) Prior Publication Data

US 2008/0121405 A1  May 29, 2008

Related U.S. Application Data

(60) Provisional application No. 60/861,639, filed on Nov. 28, 2006.

(51) Int. Cl.
  *H02G 3/08* (2006.01)
(52) U.S. Cl. .............. 174/50; 174/58; 174/64; 174/63; 439/535; 220/327; 361/752; 361/730
(58) Field of Classification Search ............ 174/50, 174/58, 64, 63; 361/752, 730, 736; 439/535; 220/327, 3.2
  See application file for complete search history.

(56) References Cited

U.S. PATENT DOCUMENTS

| 3,940,013 | A | 2/1976 | Bonnett |
|---|---|---|---|
| D245,906 | S | 9/1977 | Taylor et al. |
| 4,158,757 | A * | 6/1979 | Reichert et al. .......... 200/302.1 |
| 4,226,393 | A | 10/1980 | Rardin et al. |
| D286,765 | S | 11/1986 | Prouty et al. |
| 5,833,110 | A | 11/1998 | Chandler et al. |
| D437,586 | S | 2/2001 | Sonntag |
| 6,604,798 | B1 | 8/2003 | Cooney |
| 6,816,381 | B2 * | 11/2004 | Takeuchi .................. 361/752 |
| 2005/0072590 | A1 | 4/2005 | Hull et al. |
| 2005/0199621 | A1 | 9/2005 | Hull et al. |

OTHER PUBLICATIONS

Sell Sheets or promotional materials from Integra (5 pages).

* cited by examiner

*Primary Examiner*—Dhiru R Patel
(74) *Attorney, Agent, or Firm*—Fraser Clemens Martin & Miller LLC; J. Douglas Miller

(57) ABSTRACT

An electrical box with a mounting system is disclosed. The electrical box includes a main body having a back panel with a raised portion and a protuberance formed on an outer surface of the back panel. The mounting tab is configured for mounting the main body to a mounting structure. An electrical box assembly including the mounting tab having a first aperture that receives the protuberance of the main body, and a method for mounting the electrical box on a mounting structure, are also disclosed.

16 Claims, 4 Drawing Sheets

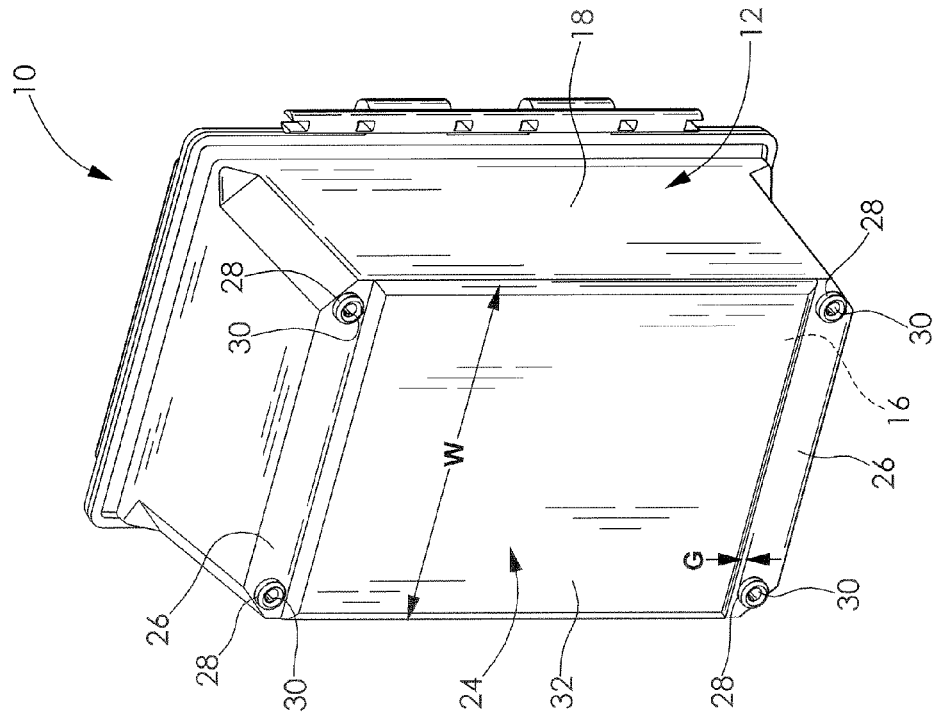
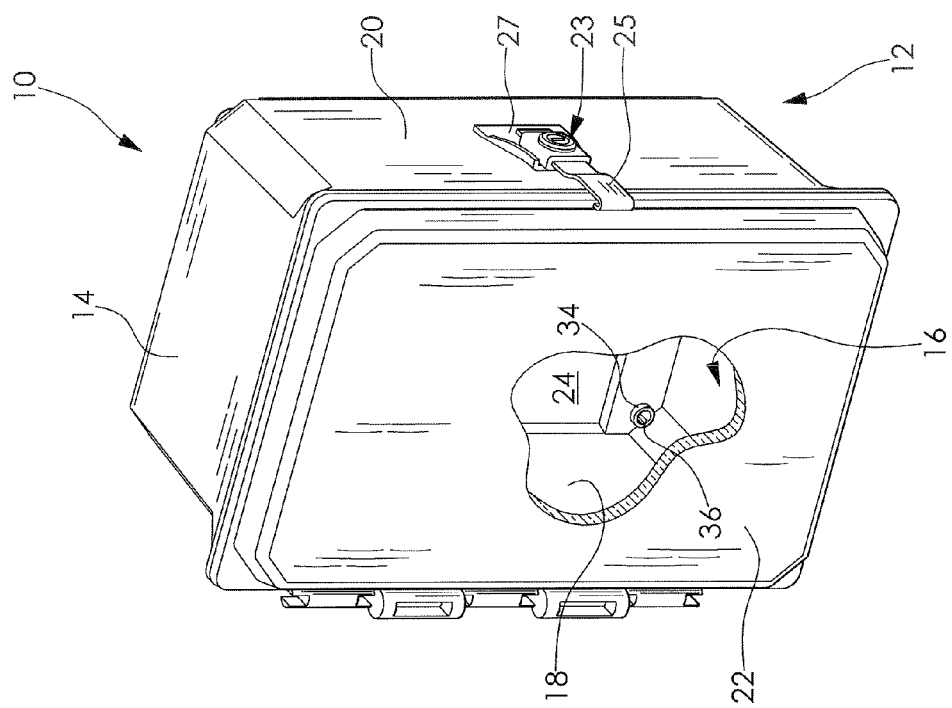
FIG. 1
FIG. 2

ELECTRICAL BOX WITH MOUNTING SYSTEM

CROSS-REFERENCE TO RELATED APPLICATION

This application claims priority to U.S. Provisional Patent Application Ser. No. 60/861,639, filed Nov. 28, 2006, the entire disclosure of which is incorporated herein by reference.

FIELD OF THE INVENTION

The present invention relates to an electrical box and more particularly to an electrical box having a mounting system for mounting the box to one of a plurality of different mounting structures.

BACKGROUND OF THE INVENTION

Typically, an electrical box is used to support and contain electrical devices and wiring in a convenient manner. The electrical box protects the wiring and the electrical devices contained therein. A cover plate or door can be provided to further protect the wiring and the electrical devices, and militate against accidental electrocution of a user. In some instances, the box is connected to a joist or other structural component of a building. In other instances, the box is connected to other structures such as a pole, for example.

Prior art electrical boxes include mounting systems that facilitate a connection to certain mounting structures, but not to other mounting structures. Accordingly, an electrical box having a correct mounting system must be selected for each application of the electrical box. Selection of the correct electrical box can be time consuming. Further, if an incorrect electrical box is selected and used, the connection between the electrical box and the mounting structure facilitated by the mounting system may be inadequate, which is undesirable.

It would be desirable to produce an electrical box which can be readily and securely mounted to a plurality of different mounting structures, wherein a complexity and cost of the box are minimized, and a functionality of the box is maximized.

SUMMARY OF THE INVENTION

True to the present invention, an electrical box which can be readily and securely mounted to a plurality of different mounting structures, wherein a complexity and cost of the electrical box are minimized, and a functionality of the electrical box is maximized, has surprisingly been discovered.

In one embodiment, an electrical box includes a main body having a back panel with a raised portion. The back panel has an outwardly extending protuberance formed on an outer surface thereof. The main body is adapted to be joined with a mounting tab for mounting the main body to a mounting structure.

In a further embodiment, an electrical box assembly has a main body with a back panel with a raised portion. The back panel has an outwardly extending protuberance formed on an outer surface thereof. The electrical box assembly includes a mounting tab having a first aperture formed therein. The first aperture receives the protuberance of the main body. A first fastener is disposed in the first aperture through an opening formed in the protuberance and attaches the mounting tab to the main body.

In an additional embodiment, a method for mounting an electrical box is described. The method first includes the steps of providing a main body including a back panel with a protuberance formed thereon, wherein the protuberance has an opening formed therein adapted to receive a first fastener. Additionally, a mounting tab is provided, having a first aperture and a second aperture. The protuberance of the back panel is disposed within the first aperture of the mounting tab. A first fastener is inserted through the first aperture and into the opening of the protuberance to fasten the mounting tab to the main body.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a front perspective view of an electrical box according to an embodiment of the invention;

FIG. 2 is a rear perspective view of the electrical box illustrated in FIG. 1;

DETAILED DESCRIPTION OF THE INVENTION

Figure 3:
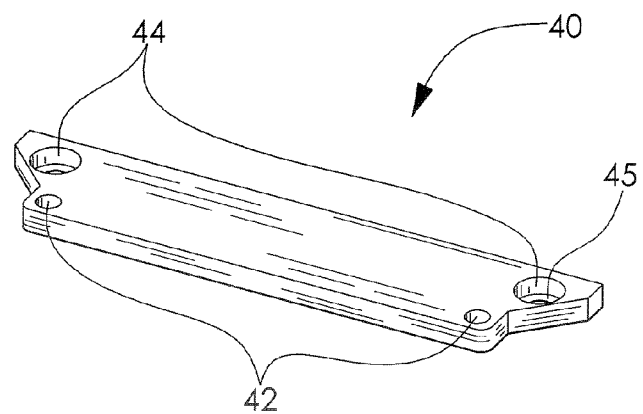
FIG. 3 is a perspective view of an elongated mounting tab for mounting the electrical box illustrated in FIGS. 1 and 2.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

FIG. 1 illustrates an electrical box 10 according to an embodiment of the invention. The electrical box 10 includes a main body 12 having a substantially rectangular cross-sectional shape. It is understood that the electrical box 10 may have other cross sectional shapes as desired. The main body 12 includes a top panel 14, a bottom panel 16, a first side panel 18, a second side panel 20, a front panel 22, and a back panel 24.

The front panel 22 is hingedly attached to the first side panel 18. The front panel 22 facilitates a selective opening and closing of the electrical box 10. It is understood that the front panel 22 can be pivotally attached to other portions of the electrical box 10 as desired. In the embodiment shown, the front panel 22 is removable from the main body 12. Alternatively, the front panel 22 can be fixed to the main body 12. The front panel 22 may be formed from a substantially transparent material. The front panel 22 can also be formed from other materials as desired.

Optionally, the electrical box 10 may include a locking device 23 attached thereto. The locking device 23 shown in FIG. 1 includes a locking tab 25 disposed on the front panel 22 and a tab receiving and securing device 27 disposed on the second side panel 20. It is understood that the locking device 23 and the securing device 27 can be disposed on other structure of the electrical box 10 as desired. It is also understood that other types of locking devices can be used.

As shown in FIG. 2, the back panel 24 includes a first outer surface 26 having a plurality of outwardly extending protuberances 28 formed thereon. It is understood that additional or fewer protuberances 28 can be formed on the first outer surface 26 as desired. The protuberances 28 can include apertures 30 formed therein. The apertures 30 are adapted to receive a first fastener 51. The apertures 30 may be adapted to receive a threaded metal insert, for example, that enables a repeated insertion and removal of the first fastener 51.

The back panel 24 also includes a second outer surface 32 spaced apart from the first outer surface 26, forming a raised portion thereon. The second outer surface 32 is disposed between the protuberances 28 formed adjacent to the top panel 14 and the protuberances 28 formed adjacent to the bottom panel 16. In the embodiment shown, the second outer surface 32 extends across an entire width W of the main body 12. It is understood that the second outer surface 32 can extend across a larger or smaller distance as desired. Gaps G are formed on the first outer surface 26 between the protuberances 28 and the second outer surface 32.

An inner surface of the back panel 24 includes a plurality of protuberances 34 formed thereon. The protuberances 34 include apertures 36 formed therein. Optionally, additional structure (not shown) such as a mounting panel can be mounted in the electrical box 10 and fastened to the protuberances 34.

FIG. 3 shows an elongated mounting tab 40 adapted to be fastened to the electrical box 10. The mounting tab 40 includes a plurality of first apertures 44 and a plurality of second apertures 42. The first apertures 44 have lips 45 formed at an end of the first apertures 44. The lip 45 of each first aperture 44 defines a central opening adopted to receive the first fastener 51. The protuberances 28 are disposed in the first apertures 44 and abut the lips 45. The first fasteners 51 are inserted into the openings defined by the lips 45 to fasten the protuberances 28 to the mounting tab 40. The second apertures 42 are adapted to receive the second fasteners 53. A spacing between the second apertures 42 substantially corresponds to a spacing of apertures formed in a structure (not shown) to which the electrical box 10 will be mounted. It is understood that additional apertures (not shown) can be formed in other locations on the mounting tab 40 as desired.

Figure 4:
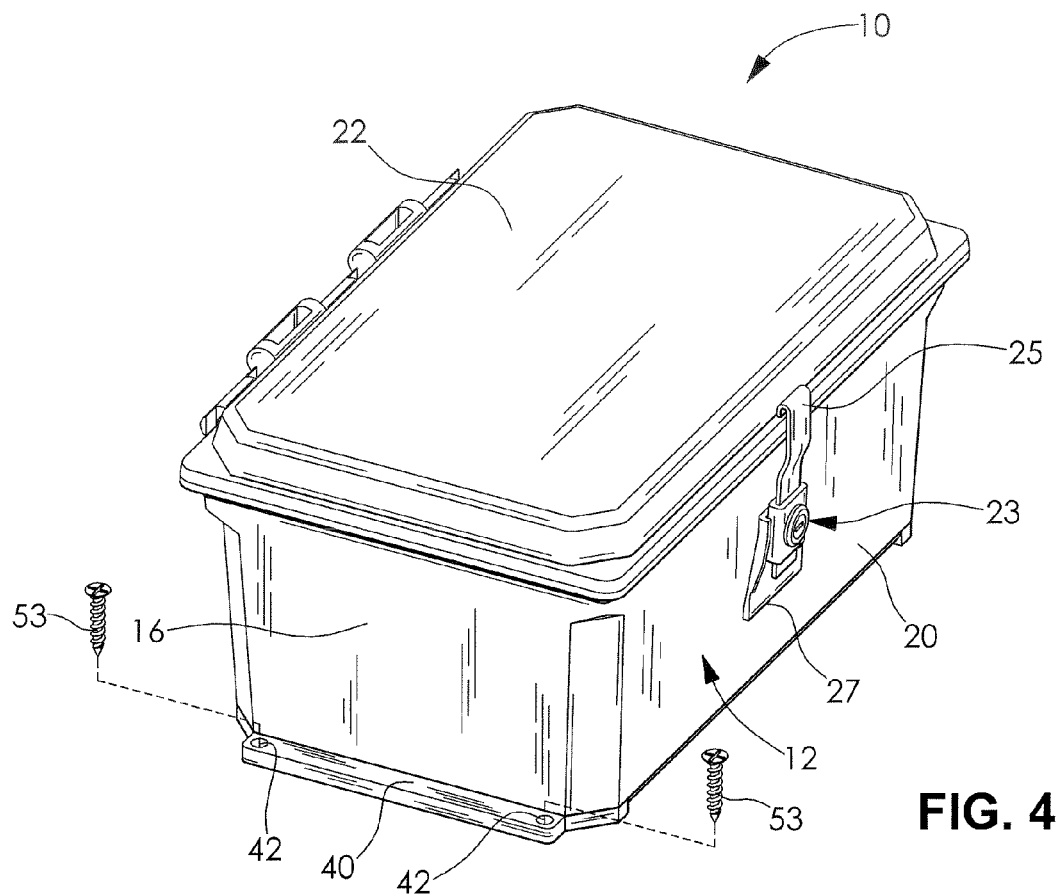
FIG. 4 is a perspective view of the electrical box illustrated in FIGS. 1 and 2 joined with the elongated mounting tab illustrated in FIG. 3.

When fastened to the electrical box 10 as shown in FIG. 4, the plurality of first apertures 44 of the mounting tab 40 are aligned with the protuberances 28 formed on the first outer surface 26 of the back panel 24. The protuberances 28 are disposed in the first apertures 44 and abut the lips 45. The first fasteners 51 are inserted into the openings defined by the lips 45 to fasten the protuberances 28 to the mounting tab 40. Accordingly, movement between the mounting tab 40 and the electrical box 10 is militated against. If the first fasteners 51 have a length that is less than a length of the protuberances 28 formed on the back panel 24, the ends of the first fasteners 51 remain in the protuberances 28 when fastened to the electrical box 10. Accordingly, the first fasteners 51 do not protrude into the main body 12 of the electrical box 10, where the first fasteners 51 could interfere with or damage wiring (not shown) or other electrical devices (not shown) inside of the main body 12 of the electrical box 10. As defined herein, wiring includes electrical wires, cables, and the like, for example.

Once the mounting tab 40 is fastened to the electrical box 10, the assembled electrical box 10 is positioned as desired, such as adjacent a single mounting surface (not shown) or a pair of substantially parallel mounting surfaces (not shown), for example. It is understood that the electrical box 10 can be positioned in other locations as desired.

Figure 5:
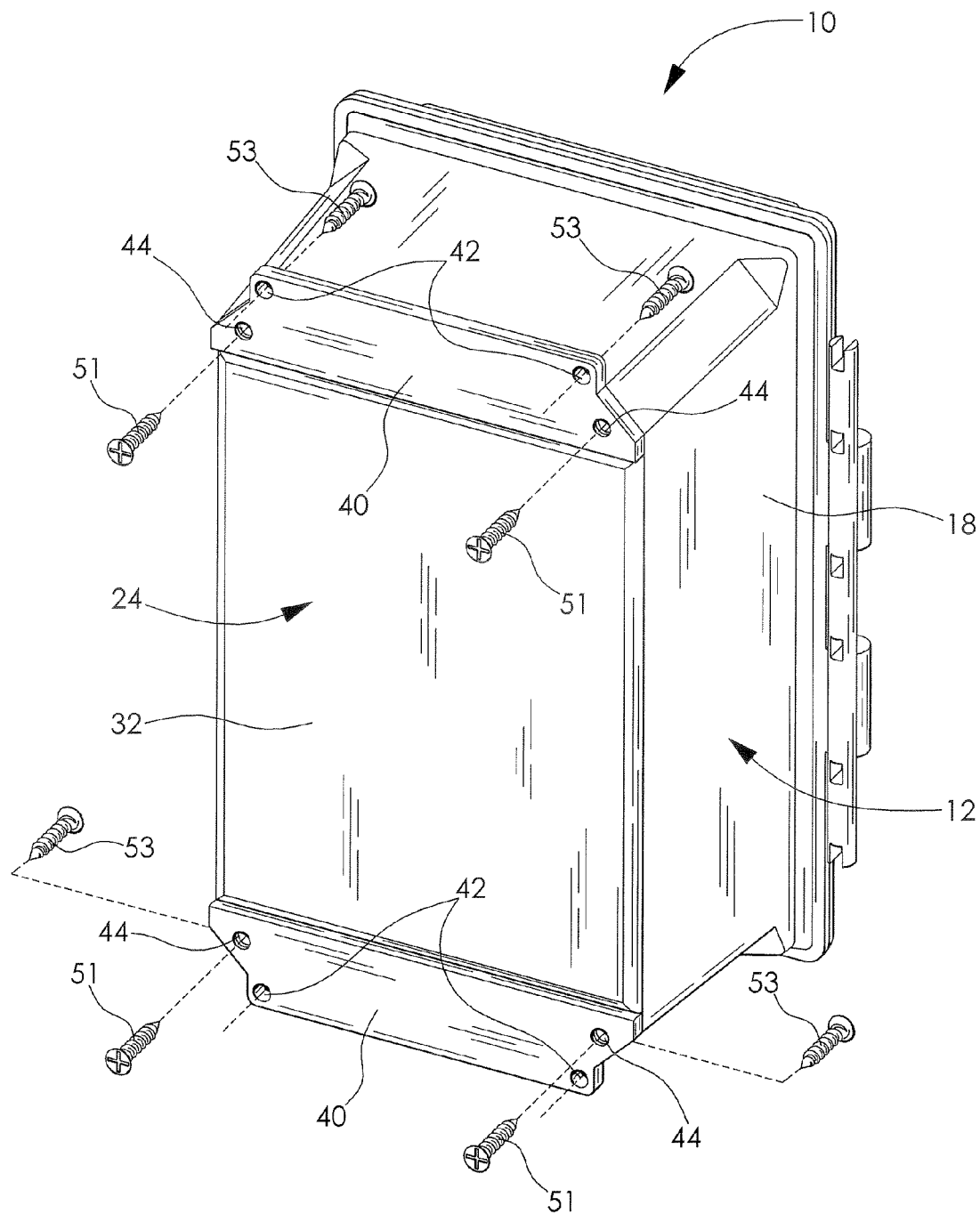
FIG. 5 is a rear perspective view of the electrical box illustrated in FIG. 1 joined with the elongated mounting tab.

FIG. 5 shows the second fasteners 53, which are inserted through the plurality of second apertures 42 formed in the mounting tab 40 and attached to the mounting surface to secure the electrical box thereto.

Figure 6:
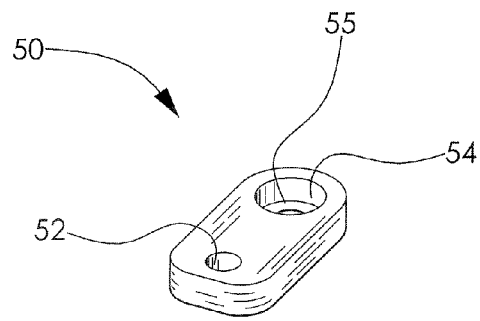
FIG. 6 is a perspective view of a mounting tab for mounting the electrical box illustrated in FIGS. 1 and 2.

FIG. 6 shows a mounting tab 50 adapted to be fastened to the electrical box 10 in accordance with another embodiment of the invention. The mounting tab 50 includes a first aperture 54 that is aligned with one of the protuberances 28 formed on the first outer surface 26 of the back panel 24. The first aperture 54 has a lip 55 formed at an end of the first aperture 54. One of the protuberances 28 are disposed into the first aperture 54 and abuts the lip 55. A first fastener 51 is inserted into the opening defined by the lip 55 to fasten one of the protuberances 28 to the mounting tab 50. The mounting tab 50 has a second aperture 52 formed therein adapted to receive the second fastener 53.

Figure 7:
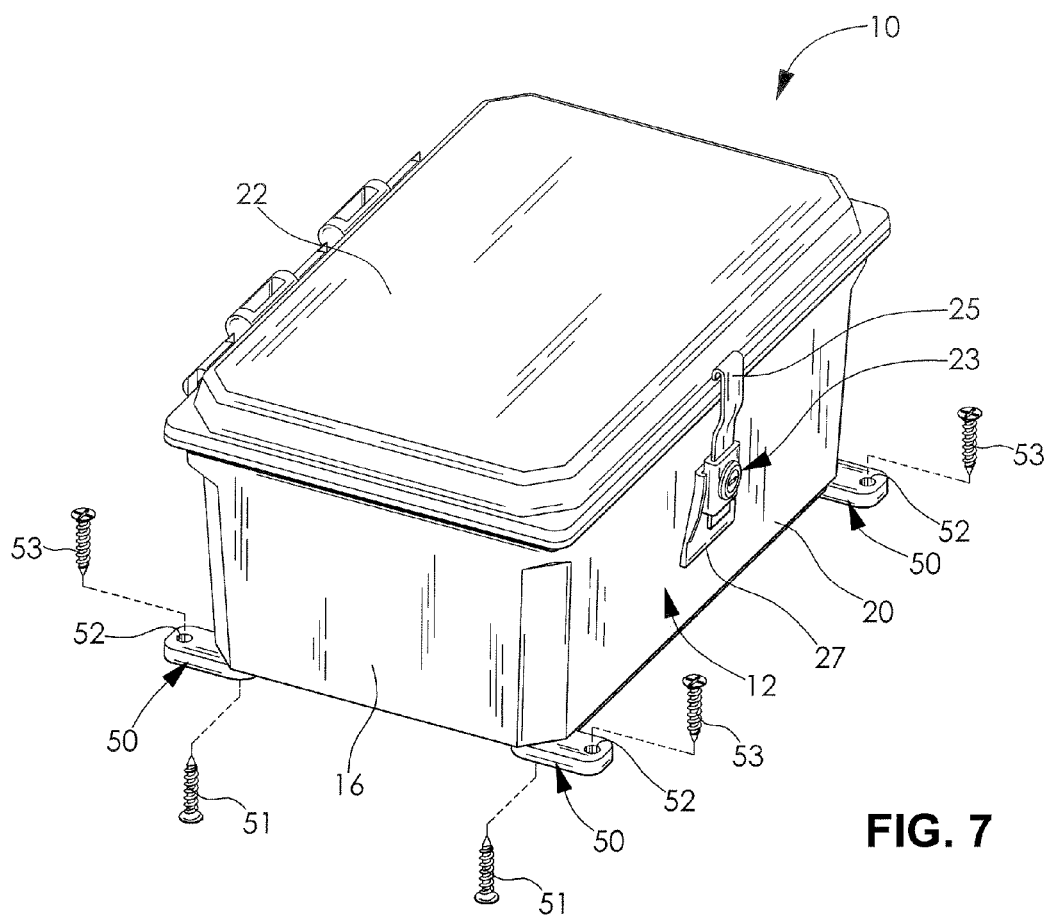
FIG. 7 is a perspective view of the electrical box illustrated in FIGS. 1 and 2 joined with a plurality of the mounting tabs illustrated in FIG. 6.

FIG. 7 shows a particular embodiment where the mounting tab 50 is secured by a first fastener 51, the mounting tab is permitted to rotate about one of the protuberances 28. The second outer surface 32 of the back panel 24 and an outer surface of each of the mounting tabs 50 lie on substantially the same plane. Thus, rotation of the mounting tab 50 to a position behind the second outer surface 32 is prevented. The second outer surface 32 may have a substantially planar surface. The substantially planar surface of the second outer surface 32 may be adapted to fit tightly against and abut the mounting surface. Thus, the second outer surface 32 may support the back panel 24. The second outer surface 32, not being spaced apart from the mounting surface, may also provide an aesthetically pleasing appearance.

The second outer surface 32 may be formed, for example, by stamping or molding the second outer surface 32 in the back panel 24. Accordingly, it should be appreciated that the second outer surface 32 may form a corresponding recess in the inner surface of the back panel 24. The recess facilitates a greater interior volume of the electrical box 10. When the mounting panel is disposed on the protuberances 34 on the interior surface, the recess may accommodate at least one of fasteners and wires that may be disposed between the mounting panel and the back panel 24.

A skilled artisan should understand that, if the first fastener 51 has a length that is less than a length of one of the protuberances 28 formed on the back panel 24, the end of the first fastener 51 remains inside one of the protuberances 28 when fastened to the electrical box 10. Accordingly, the first fastener 51 does not protrude into the main body 12 of the electrical box 10, where the first fastener 51 could interfere with or damage wiring (not shown) or other electrical devices (not shown) inside of the main body 12 of the electrical box 10.

Once the mounting tab 50 is fastened to the electrical box 10, the assembled electrical box 10 is positioned as desired, such as adjacent to a single mounting surface (not shown) or a pair of substantially parallel mounting surfaces (not shown), for example. It is understood that the electrical box 10 can be positioned in other locations as desired. The second fastener 53 is then inserted through the second aperture 52 formed in the mounting tab 50 and into the mounting structure to secure the electrical box 10 thereto.

The electrical box 10 described above can be mounted using either the mounting tab 40 or the mounting tab 50. If it is desired to adjust the location of the electrical box 10, the second fastener 53 can be removed from the mounting structure which the electrical box 10 is mounted upon. If the other of the mounting tab 40 or the mounting tab 50 is needed for remounting the electrical box 10, the first fasteners 51 can be removed from the protuberances 28. Thereafter, whichever of the mounting tab 40 or the mounting tab 50 is needed to mount the electrical box 10 to the mounting structure is secured to the electrical box 10. The electrical box 10 is then mounted to a new structure as described above.

The electrical box 10 described above can be mounted to a plurality of different mounting structures by changing either the mounting tab 40 or the mounting tab 50 attached to the electrical box 10. Accordingly, the same electrical box 10 can be used for different applications, rather than requiring a different box for different applications.

While certain representative embodiments and details have been shown for purposes of illustrating the invention, it will be apparent to those skilled in the art that various changes may be made without departing from the scope of the disclosure, which is further described in the following appended claims.

What is claimed is:

1. An electrical box assembly comprising: a main body having a back panel including a first outer surface with a protuberance extending therefrom and a second outer surface forming a raised portion on the back panel, the protuberance having an opening formed therein; a mounting tab having a first aperture removably received by the protuberance on the first outer surface of the main body; and a first fastener disposed in the first aperture through the opening formed in the protuberance and attaching the mounting tab to the main body.

2. The electrical box according to claim 1, wherein the first aperture includes an opening defined by a lip adapted to receive a first fastener.

3. The electrical box according to claim 1, wherein the raised portion militates against a rotation of the mounting tab to a position substantially behind the main body.

4. The electrical box according to claim 1, wherein a gap is formed in the back panel between the raised portion and the protuberance.

5. The electrical box according to claim 1, further comprising a front panel pivotally attached to the main body.

6. The electrical box according to claim 5, further comprising a locking device disposed on the main body and adapted to selectively militate against opening the front panel.

7. The electrical box according to claim 1, wherein the raised portion forms a recess on an inner surface of the back panel.

8. The electrical box according to claim 1, wherein the raised portion has a substantially planar surface.

9. The electrical box according to claim 1, the back panel having at least one protuberance formed on an inner surface thereof.

10. The electrical box assembly of claim 1, wherein the mounting tab includes a second aperture formed therein.

11. The electrical box assembly of claim 10, further comprising a second fastener inserted through the second aperture to mount the electrical box assembly to a mounting structure.

12. A method for mounting an electrical box, the method comprising the steps of:
    providing a main body including a back panel having a first outer surface with a protuberance extending therefrom and a second outer surface forming a raised portion on the back panel, the protuberance having an opening formed therein adapted to receive a first fastener;
    providing a mounting tab having a first aperture and a second aperture;
    disposing the protuberance of the back panel within the first aperture of the mounting tab; and
    inserting the first fastener through the first aperture and into the opening of the protuberance to fasten the mounting tab to the main body.

13. The method of mounting the electrical box according to claim 12, further comprising:
    aligning the mounting tab with a desired location on a mounting structure;
    providing a second fastener; and
    inserting the second fastener through the second aperture to fasten the mounting tab to the mounting structure.

14. The method of mounting the electrical box according to claim 13, wherein the step of aligning the mounting tab includes the step of:
    rotating the mounting tab to align the mounting tab with the desired location on the mounting structure.

15. The method of mounting the electrical box according to claim 12, wherein the back panel includes at least one protuberance formed on an inner surface thereof.

16. The method of mounting the electrical box according to claim 12, wherein the first fastener has a length that militates against an intrusion of the first fastener into the main body upon the fastening of the mounting tab to the back panel.

* * * * *